United States Patent [19]

Clagett

[11] Patent Number: 5,105,197
[45] Date of Patent: Apr. 14, 1992

[54] MOBILE ACCESS TO TELECOMMUNICATIONS NETWORK

[75] Inventor: Donald J. Clagett, Rockville, Md.

[73] Assignee: Bell Atlantic Network Services, Inc., Arlington, Va.

[21] Appl. No.: 684,098

[22] Filed: Apr. 12, 1991

Related U.S. Application Data

[63] Continuation-in-part of Ser. No. 667,990, Mar. 12, 1991.

[51] Int. Cl.⁵ .............................................. H04Q 7/00
[52] U.S. Cl. ........................................ 342/419; 379/59
[58] Field of Search .................... 342/419; 455/33, 56, 455/54; 379/59, 58, 60, 61

[56] References Cited

U.S. PATENT DOCUMENTS

| | | | |
|---|---|---|---|
| 4,907,290 | 3/1990 | Crompton | 455/56 |
| 4,984,290 | 1/1991 | Levine et al. | 455/33 |
| 5,023,900 | 6/1991 | Taylor et al. | 379/59 X |

*Primary Examiner*—Mark Hellner
*Attorney, Agent, or Firm*—Lowe, Price, LeBlanc & Becker

[57] ABSTRACT

A method and system for providing mobile access to message delivery into the existing public telecommunications network. A portable handset and transceiver have storage capacity and a processor for digitizing and time compressing messages inputted by the operator into the handset. Upon command of the handset operator the stored message is transmitted to a fixed site transceiver having storage capacity. The two transceivers are locked into communication by suitable handshake protocols. The fixed site transceiver is linked to the public switched telecommunications network and delivers the message stored in the fixed site storage to voice messaging service storage in the public telecommunications network. The message thus stored is either delivered as by call completion service or retrieved by the addressee as in voice mail service. In both cases the signal from the VMS storage is processed to perform digital to analog conversion along with time decompression or expansion. The addressee, handling procedures, and billing information are incorporated into the original message in the handset transceiver. Periodic beacon signals may be provided at the fixed site transceiver to facilitate location thereof by the portable handset and transceiver.

20 Claims, 3 Drawing Sheets

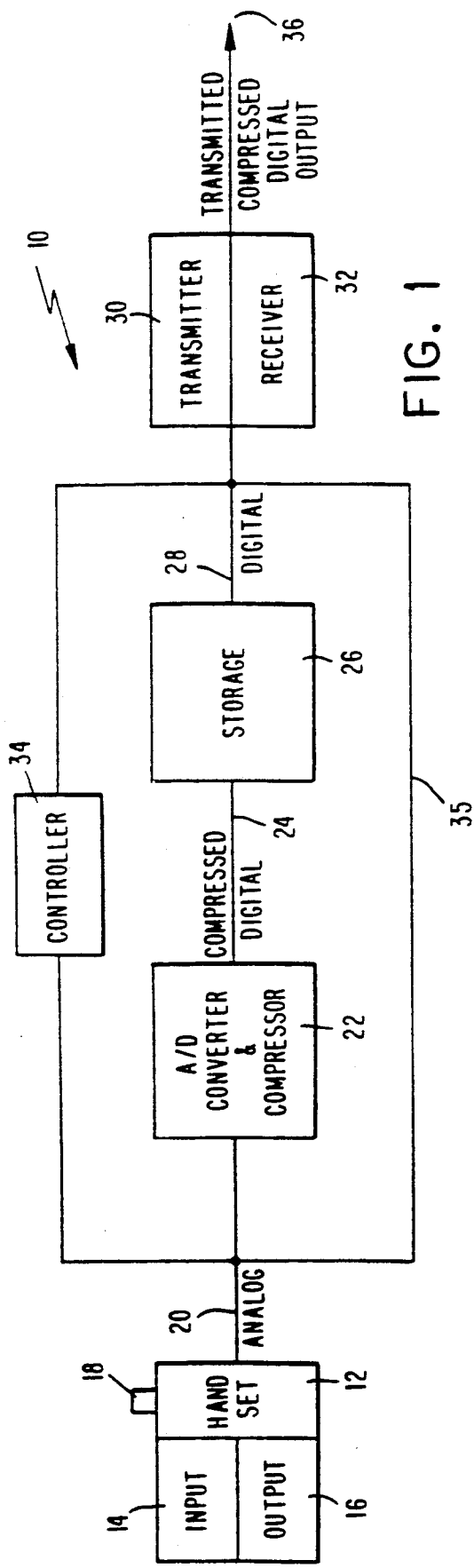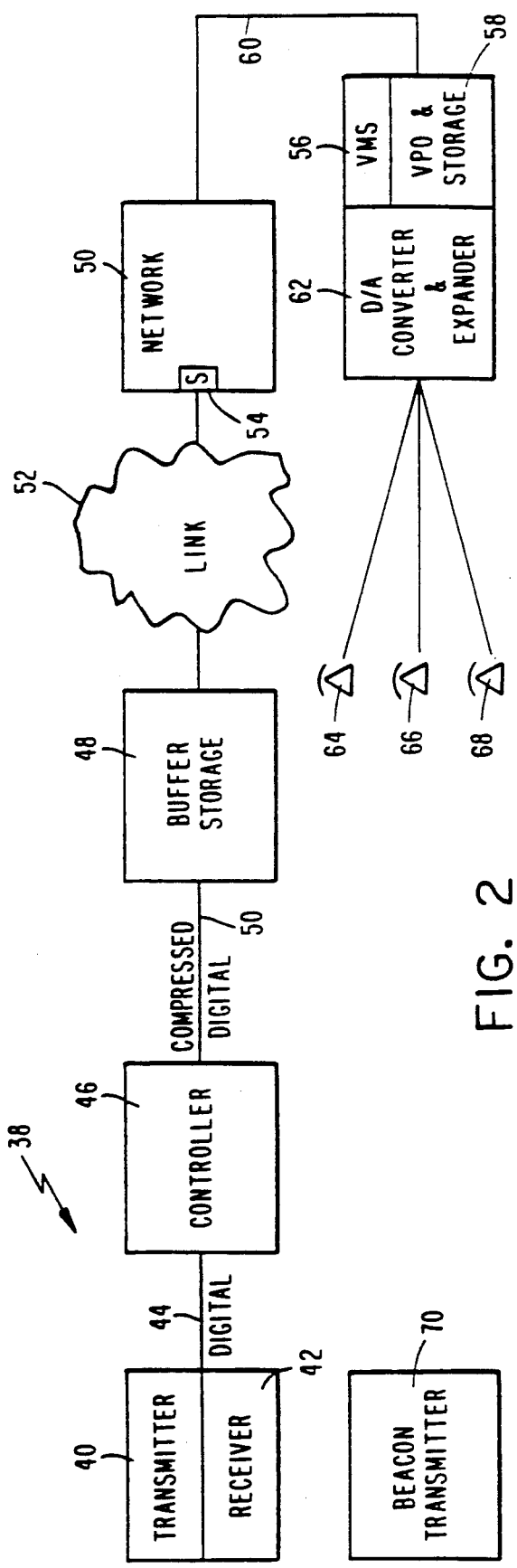

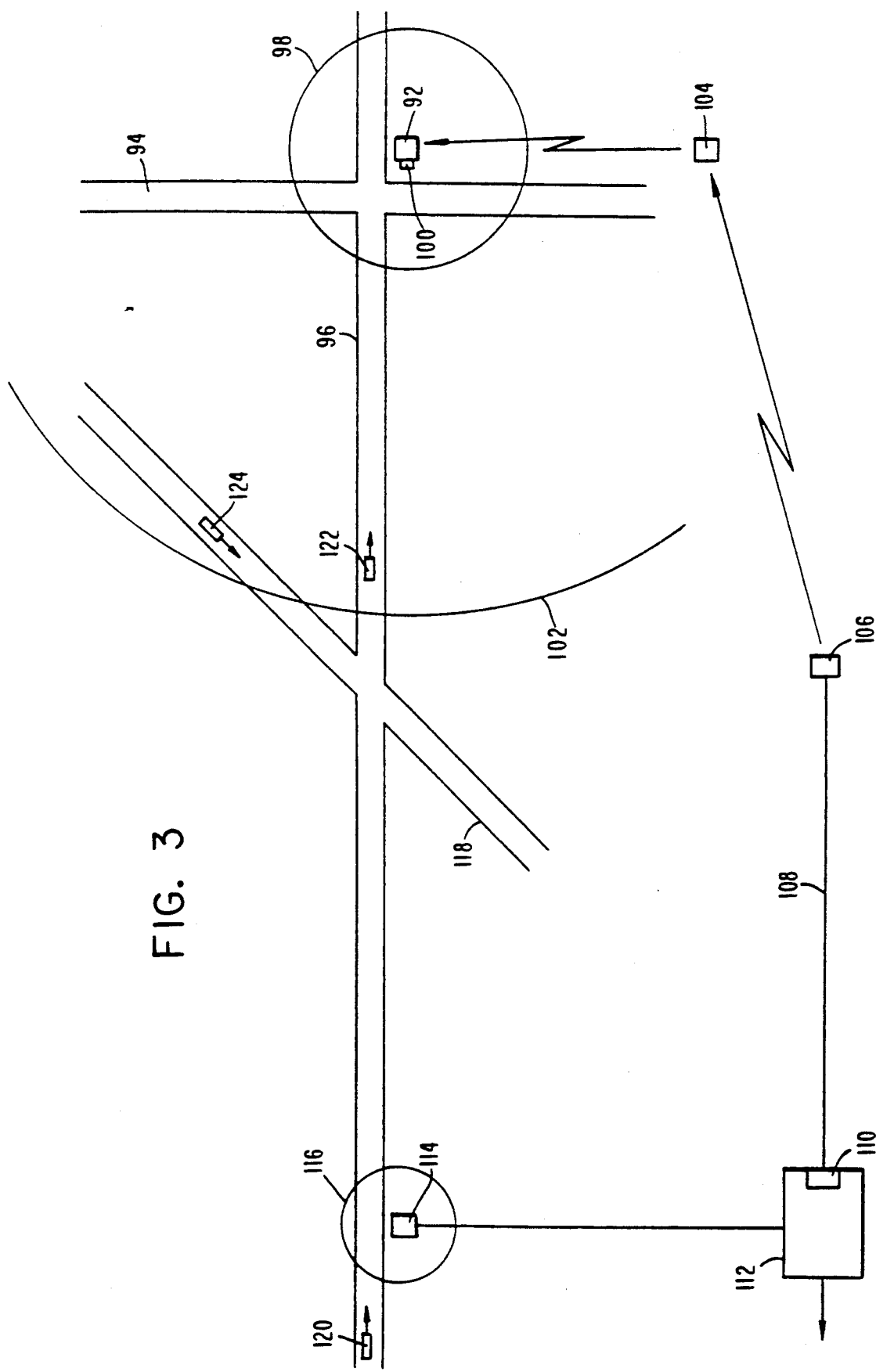

MOBILE ACCESS TO TELECOMMUNICATIONS NETWORK

RELATED APPLICATIONS

This application is a continuation-in-part of application Ser. No. 07/667,990 pending, filed Mar. 12, 1991, which application is herein incorporated by reference.

TECHNICAL FIELD

This invention relates to telecommunications services and systems and more particularly to systems and services which provide mobile access to telecommunications networks.

BACKGROUND ART

Telecommunications systems and services today are in an era of rapid evolution aimed at providing alternatives to the wired public switched telecommunications network (PSTN). Most of the proposed alternatives to the conventional subscriber PSTN provide an added degree of mobility to telephone usage. As pointed out in further detail in the above referenced parent application, some of the presently existing options include cordless telephones, cellular telephones, conventional pay phones, paging, telepoint, and Personal Communications Networks (PCNs).

The present invention is intended to provide options and services not now known to exist and which include improvements over the above mentioned evolving services.

DISCLOSURE OF THE INVENTION

The service and system of the present invention is intended to provide automatic mobile access to message delivery into the existing public telecommunications network. According to one aspect of the invention, a motorist may be provided with a portable handset and transceiver having the capability of storing at the transceiver messages inputted by the motorist. The motorist may then deliver such messages over a wireless link as he/she enters the range of a stationary transceiver cell site. The motorist can press a button to transmit a signal to fully activate the cell site radio transceiver and establish a protocol indicating a readiness to transmit one or more messages. The fixed transceiver at the site would respond to acknowledge readiness to receive the messages, store them and introduce them into the telecommunications network.

Once in the network the messages may be delivered to a voice message mailbox or a voice message storage for retrieval or automatic delivery. Preferably the handset and transceiver of the motorist are provided with a processor to synthesize the analog messages as digital data and to transmit the synthesized data either seriatim or in a multiplexed form (multiplexed messages). The analog to digital synthesis may include digital speech interpolation (DS) to enhance the efficiency of the system. Time assigned speech interpolation (TASI) may be utilized with speech predictive encoded communications (SPEC). Multiple messages may be TASI multiplexed in the manner described, for example, in Kamilofeher, "Advanced Digital Communications Systems and Signal Processing Techniques," Prentice Hall, Inc., 1987, pages 18-20 and Chapter 5.

The calling information and instructions are contained in the message at the beginning of the data stream of voice followed by the calling number and/or other identification at the end of the voice data. The stationary cell site station installation stores the entire data message in buffer storage for subsequent delivery to a VMS computer in the public switched telecommunications network.

The VMS computer controls the delivery of the messages to the mailbox of the designated recipient or to VMS call delivery service to the designated recipient. The link between the motorist's handset transceiver and the stationary site station is wireless and preferably a radio link. On the other hand the link between the site station and the PSTN may be wireless, wired or fiber connected. Radio linked sites may be advantageously located in sparsely populated areas, while wired or fiber linked sites may be utilized at gasoline stations, convenience stores or the like outlets in more urban areas. The compressed message data may be transmitted without requiring a motorist to stop or alternatively may be transmitted while the motorist is stopped for gasoline or food.

According to another feature of the invention the stationary site stations may be provided with beacons in the manner described in detail in my above identified co-pending application. This feature would be particularly advantageous to a motorist traveling over long stretches of highway through sparsely populated countryside. By pre-warning from the beacon the motorist may be assured of completing the message transfer without interruption of travel.

The provision of time compression in the portable handset transceiver equipment provides the advantages of improving band width, improving network utilization, and reducing necessary storage capacity. Expansion, decompression and decoding may be provided on ultimate delivery thereby insuring efficient data handling over virtually the entire network. While the invention is particularly advantageous as a means of voice messaging for motorists it is also within the purview of the invention to provide other forms of communication over the same system. Facsimile machines are now available in portable form and may be utilized as the originator and ultimate receptor of the message data. Other forms of image transmission may also be utilized.

A particular advantage of the invention is that the protocol utilized by the sending handset transceiver may contain an automatically inserted packet of data to permit automated billing. In addition the entire concept is compatible with the Artificial Intelligence Network (AIN) now in the process of implementation. The interfaces between the stationary site station and the VMS computer may comprise a system 7 signal of other packet signal and system protocol. The site station may contain a computer for performing intelligent functions. The service and system may use out of band signaling to obtain the necessary information from a site data base.

It is accordingly an object of the present invention to provide an enhanced telecommunications service via the public switched telecommunications network.

It is another object of the invention to provide a system for improving the effectiveness of the existing public switched telecommunications network in a manner which may be utilized in conjunction with evolving technologies such as telepoint communications.

It is another object of the invention to provide an improved wireless message service and system to deliver messages via the public switched telecommunications system from a mobile or stationary originating site.

It is another object of the invention to provide an improved wireless messaging system for delivering prerecorded messages from mobile originating stations to advantageously sited stationary stations connected to a telecommunications network.

It is yet another object of the invention to provide an improved wireless messaging system which permits the delivery of prerecorded messages in multiple formats selectable by the originator via the public switched telecommunications network.

It is another object of the invention to provide a wireless messaging system of the foregoing type which includes as an automatic feature thereof billing methodology which is compatible with established automated billing techniques.

It is another object of the invention to provide an improved wireless messaging system and service from mobile originating stations via strategically located base stations linked to the public switched telecommunications network and having beacons located at such base stations to facilitate communication therewith.

Other advantages of the invention will become apparent from a study of the following specification, claims and appended drawings wherein:

BRIEF DESCRIPTION OF DRAWINGS

FIG. 1 is a diagrammatic illustration of a preferred embodiment of a portable handset and transceiver installation according to the invention;

FIG. 2 is a diagrammatic illustration of a preferred embodiment of a stationary transceiver site installation connected to the public switched telecommunications network;

FIG. 3 is a map-like projection showing the geographic disposition of originating and stationary site base stations according to a preferred embodiment of the invention.

BEST MODE FOR CARRYING OUT THE INVENTION

Figure 4:
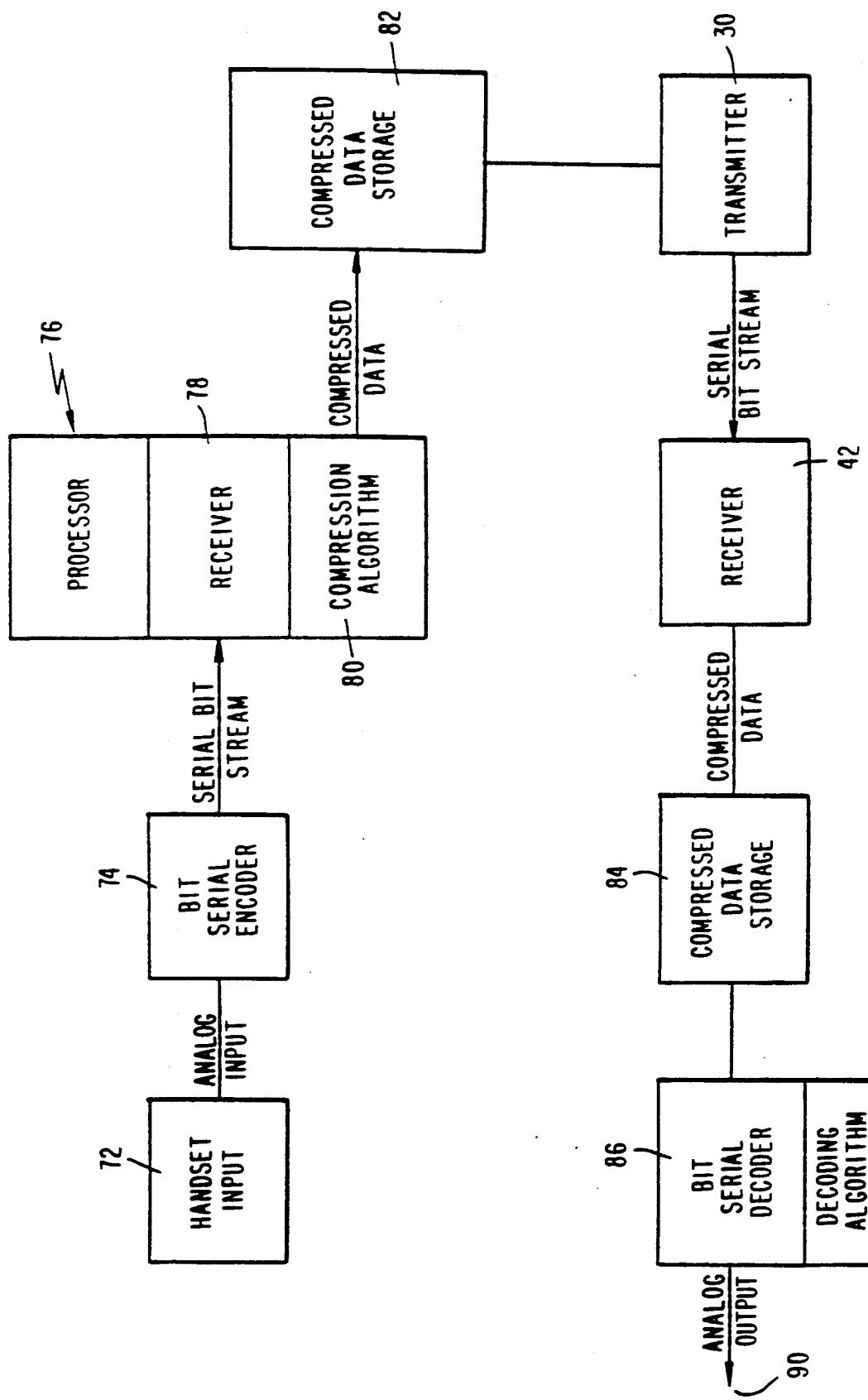
FIG. 4 is a diagrammatic illustration of an encoding and decoding arrangement.

Referring to FIG. 1 there is shown at 10 a portable transceiver device which may be installed in an automotive vehicle in the manner of a cellular telephone or which may be battery powered and completely portable, also as is common with cellular telephones. The device comprises a handset 12 which includes a conventional input or microphone 14 and output or ear piece 16. An actuation button 18 is provided for a purpose to be described.

The output of the handset comprises an analog voice signal which is fed by link 20 to an analog to digital converter and compressor 22. The converter and compressor 22 converts the audio input to a digital representation which is encoded prior to storage in a digital form. The encoding preferably includes time compression which minimizes the space required for storage of the digital information and minimizes the time necessary to transmit the compressed information. A more detailed description of the conversion and compression is presented hereafter in conjunction with FIG. 4.

The compressed digital output from the converter and compressor 22 is fed via a link 24 to a digital storage 26. Storage 26 is connected via link 28 to a transmitter 30 and receiver 32 which are connected to and controlled by a programmer or controller 34. The controller 34 is subject to control by the handset 12 and actuating button 18. The handset 12 is provided with conventional control switching of the type employed to control cellular telephones by way of example. Suitable connection 35 may be provided from the handset 12 to the transmitter/receiver 30-32 to permit the transceiver to serve as a conventional cellular telephone.

In utilizing the portable transceiver 10 according to the invention the operator uses the handset 12 to input to storage a spoken or dictated message for delivery in a specified fashion to an addressee designated by the operator at the beginning of the recorded message. The analog signal inputted by the operator is digitized and compressed in the compressor 22 and stored in storage 26. Multiple messages may be stored and will automatically be provided with a date and time header by the controller 34 in conventional fashion. At such time as transmission of the messages may be feasible, as explained hereafter, the operator may actuate the transmitter 30 by depression of the button 18. This will actuate the controller 34 and transmitter 30 to retrieve the stored digitized messages from storage 26 and transmit the same as a compressed digital radio signal indicated at 36.

Referring to FIG. 2 there is indicated generally at 38 a fixed transceiver designed to communicate with the portable transceiver 10. The fixed transceiver 38 provides connection with the public switched telecommunications network as will be described. The transceiver 38 comprises a transmitter 40 and receiver 42 which are adapted to communicate with the portable transmitter 30 and receiver 32 and receive the transmitted compressed digital output 36.

The digital received signal from receiver 42 is fed through connection 44 to a processor controller 46 which delivers the compressed digital signal to buffer storage 48 via link 50. The fixed transceiver 38 is generally provided as a compact installation located adjacent a highway or in an urban locale where it is possible for the portable transceiver 10 to pass or stop in relatively close proximity to the fixed transceiver for purposes of communication therewith.

The fixed on-site buffer storage 48 is linked to the public switched telecommunications network indicated at 50 via a link 52 which provides a connection to a switch 54 in the network 50. The link 52 may be wireless, wired or fiber. In the case of remote fixed site installations 38, as in sparsely populated areas, the link may be wireless, as by radio. In most instances where the fixed site installation is proximate to a switch in the PSTN the link is wire or fiber.

The PSTN 50 includes a conventional voice message system (VMS) platform indicated generally at 56 which includes a voice processing unit and storage 58. The compressed digital data from the buffer storage 48 is transferred via link 52, network 50 and link 60 to the VMS storage. Depending upon the address attached to each message by the originator the digital messages received over link 60 may be stored for automatic delivery using conventional call completion services or may be stored in a designated mailbox for retrieval by the mailbox subscriber.

The message content of the storage 58 is outputted, delivered or retrieved, through a digital to analog converter and expander 62 to designated telephone stations 64, 66 and 68. It will be appreciated that the connection between the stations 64, 66 and 68 may pass through intermediate switches and trunks. The converter and expander 62 reconstructs the stored compressed data and transmits the decoded data as an analog reconstruction of the original signal inputted to the operator's handset. The fixed site installation 38 link may be provided with a beacon transmitter 70 to facilitate location of the fixed site installation by motorists as described in detail in my above identified patent application.

Referring to FIG. 4 the compression encoding and decoding of the signal is illustrated in further detail. The audio analog handset input shown at 72 is fed to the input of a bit serial encoder (digitizer) 74. The digitizer 74 can be of a type that provides a serial bit stream using either a SPFE, CVSD or MIMIC based system as described for example in U.S. Pat. No 4,802,221 to Jibbe. The serial bit stream from the digitizer is fed to a processor indicated generally at 76. The processor 76 may be an NCR Decision Mate V which operates upon the data to compress it and temporarily store it. The processor may be comprised of a receiver 78, compression algorithm 80 and storage 82 as described in the aforesaid Jibbe patent. The processor reads the original data from the bit serial encoder and processes the original data with the compression algorithm.

On the operator depression of the actuate button 18 on the handset 12 the transmitter 30 in the portable transceiver 10 transmits the serial bit stream of compressed digital data to the receiver 42 at the fixed transceiver station 38. The compressed data is stored in compressed data storage 84 which is equivalent to the buffer storage 48 in FIG. 2. When reconstruction and delivery or retrieval is desired the compressed data is fed from the compressed data storage 84 to a bit serial decoder 86 which includes a decoding algorithm 88. An analog output is produced at 90 which is either delivered, as in call completion, or retrieved, as in user of a VMS mailbox. Suitable compression and decompression algorithms are described in the aforesaid Jibbe patent.

It will be understood that other systems of analog signal encoding and compression may be utilized as is well known in the art. By way of example reference is had to U.S. Pat. No. 4,280,192 to Moll. That patent describes a system wherein an audio input is converted to a digital representation and encoded prior to storage in a digital form for minimizing the space required for storage of the digital information. Pauses are eliminated and encoded in a form indicating the occurrence of the pauses. Data is compared with prior received data such as to detect repetition. When repetition is detected, a code indication of the period of repetition and the duration of repetition is inserted in the stored data. Information is restored utilizing decoding networks responsive to the inserted codes which cause reinsertion of the pauses and repetitions. When the information is restored, background audio may be provided in the silent periods either from a separate memory or, when available, from an audio input circuit.

Still other arrangements are described in U.S. Pat. No. 4,890,325 to Taniguchi et al, U.S. Pat. No. 4,893,308 to Wilson et al, and U.S. Pat. No. 4,922,537 to Frederiksen.

Referring to FIG. 3 there is shown a geographical illustration of the system of the invention and its use. A fixed site transceiver installation is established at 92 near the intersection of highways 94 and 96. The range of the fixed transceiver with respect to a portable transceiver of the type illustrated at 10 in FIG. 1 is illustrated at 98. The fixed site installation 92 is provided with a beacon 100 of the type described in my copending patent application. The range of the beacon signal is indicated at 102. It is assumed that the countryside surrounding the intersection of highways 94 and 96 is sparsely populated and that large distances are involved. In view of the sparse population the area is devoid of existing PSTN switches or subscriber stations. The fixed site transceiver 92 is linked to the PSTN via a radio link with microwave repeaters 104 and 106. The repeater 106 is connected by wire or fiber 108 to a switch 110 in the PSTN depicted at 112.

A second fixed site transceiver station is indicated at 114 adjacent a distant portion of highway 96. The fixed site transceiver 114 has a range indicated at 116 and is not provided with a beacon. A further cross-highway 118 intersects highway 96 and extends into the range of the beacon 100 located at the fixed transceiver 92.

A motorist having a portable transceiver 10 is shown at 120 traveling east or in the direction of the arrow. According to the invention subscribers to the new service will be provided with information as to the location of fixed transceiver sites, particularly where such sites may be relatively widely spaced. Suitable signs may also be displayed at such sites to provide visual indication to a passing motorist that the site is available.

If the motorist at 120 has previously stored one or more messages in his/her portable transceiver and is aware that he/she is approaching the usable contact area 116 of fixed station 114, the motorist may transmit the stored messages without stopping or slowing down. The motorist need only depress the actuating button 18 during the time that he/she is within the range 116 of the fixed station 114.

A suitable warning or alerting signal such as a light or tone may be provided to alert the motorist to the fact that he/she is within the range of a fixed transceiver site. If the motorist does not have prestored messages at the time that the fixed transceiver site is detected either visually by a sign associated with the fixed station or by a visual or audible signal, the motorist may elect to stop within the range of the fixed site transceiver, dictate the desired message or messages, and transmit such message or messages to the fixed station for delivery to the PSTN 112 and ultimately to the addressees designated by the motorist.

According to the preferred embodiment of the invention the depression of the actuation button 18 causes the portable transceiver to initiate and proceed through a two-way handshake procedure with the fixed site transceiver. Thus depression of the button causes the portable transmitter to signal the fixed site receiver that it is ready to deliver a message. The fixed site receiver then causes its associated transmitter to acknowledge and indicate readiness to receive the messages. This signal from the fixed site transceiver then stimulates the portable receiver to actuate its associated transmitter to broadcast its encoded data string of voice messages into the fixed site transceiver station.

If a motorist is at a position indicated at 122 within the range 102 of the beacon 100 the motorist is alerted to the fact that a fixed transceiver is ahead. The motorist may then store the desired messages for delivery at such time as the motorist enters the range 98 of the fixed station 92.

If a motorist is at a position 124 traveling southwest on highway 118 the motorist will receive a signal from the beacon 100. In this instance the direction of travel of the motorist will not automatically bring the motorist into the communication range of either of the fixed transceiver stations 92 or 114. However the beacon signal contains geographic location data which provides the motorist at 124 with sufficient information to turn from highway 118 to highway 96 and enter the usable range of the fixed station 92.

While the foregoing illustrations of the use of the invention have involved motorists and automobile travel it is to be understood that the invention also finds general application is urban environments. Thus a businessman may carry a portable transceiver constructed according to the invention in a briefcase. This will provide convenient access to fixed site transceiver stations located at airports, convenience stores, public buildings, and the like.

The invention provides a new dimension to voice messaging services using the existing public switched telecommunications network. The new service may be made available without modification of the PSTN with the simple addition of fixed transceiver sites and the provision of portable transceiver units. The fixed transceivers may be located at existing sites available to the Telco, such as at public coin telephone stations. While the data described in the foregoing illustrations of the invention have comprised voice signals it will be apparent that other message formats may be utilized as, for example, facsimile.

It will be evident from the foregoing that the new invention provides an enhanced telecommunications service via the public switched telecommunications network. Prerecorded messages may be delivered in wireless fashion from mobile originating stations for delivery or retrieval using existing PSTN voice messaging facilities. Automatic billing may be provided through billing methodology which is compatible with established billing techniques. Beacon signals may be utilized to further enhance the convenience and usability of the service. The invention relies upon available technology and may be implemented with minimal hardware installation and/or change.

Still other objects and advantages of the present invention will be readily apparent to those skilled in this art from the foregoing description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly the drawings and descriptions are to be regarded as illustrative in nature, and not as restrictive.

I claim:

1. In a telecommunications system including a switched telecommunications network having switching means interconnected by trunk means and station means linked to at least certain of said switching means, the improvement comprising;
   at least certain of said station means comprising fixed site transceiver means;
   portable transceiver means including signal input means and signal output means and transmitter means and receiver means capable of communicating with said fixed site transceiver means;
   first storage means associated with said portable transceiver means;
   means coupling said input signal means of said portable transceiver means with said first storage means to store in said first storage means a signal from said input signal means;
   means associated with said portable transceiver means to couple said first storage means with said transmitter means to transmit a signal stored in said first storage means;
   control means associated with said portable transceiver means to initiate transmission by said transmitter means;
   second storage means associated with said switched telecommunications network for storing signals received from said transmitter means;
   means associated with said switched telecommunications network to couple said second storage means to at least one of said station means to provide at said station means a readable output of signals stored in said second storage means.

2. A telecommunications system according to claim 1 wherein said readable output is audible.

3. A telecommunications system according to claim 1 wherein said readable output is visual.

4. A telecommunications system according to claim 1 wherein said means coupling said input signal means with said first storage means includes analog to digital converter means for converting an analog input to said signal input means to a digital signal stored in said first storage means.

5. A telecommunications system according to claim 4 wherein said means associated with said telecommunications network to couple said second storage means to said at least one of said station means includes digital to analog converter means to convert a digital signal stored in said second storage means to an analog readable output.

6. A telecommunications system according to claim 5 wherein said analog to digital converter means includes time compression means; and
   said digital to analog converter means includes expansion means.

7. A telecommunications system according to claim 5 wherein said switched telecommunications network includes voice messaging means for automatically attempting delivery of signals stored in said second storage means to stations identified in said signals.

8. A telecommunications system according to claim 5 including beacon transmitter means associated with said fixed site transceiver means for periodically transmitting a beacon signal.

9. In a telecommunications system including a switched telecommunications network having switching means interconnected by trunk means and station means linked to at least certain of said switching means, the improvement comprising;
   at least certain of said station means comprising fixed site transceiver means;
   portable transceiver means including analog signal input means and analog signal output means and transmitter means and receiver means capable of communicating with said fixed site transceiver means;
   first storage means associated with said portable transceiver means;
   first processing means coupling said input signal means of said portable transceiver means with said first storage means to store in said first storage means a digitized signal derived from said analog signal input;
   means associated with said portable transceiver means to couple said first storage means with said transmitter means to transmit a digital signal stored in said first storage means;

control means associated with said portable transceiver means to initiate transmission by said transmitter means;

second storage means associated with said switched telecommunications network for storing digital signals received from said transmitter means;

second processing means associated with said switched telecommunications network to couple said second storage means to at least one of said station means to provide at said station means an analog signal output corresponding to digital signals stored in said second storage means.

10. A telecommunications system according to claim 9 wherein said first processing means includes time compression means; and said second processing means includes expansion means.

11. A telecommunications system according to claim 9 wherein said switched telecommunications network includes voice messaging means for automatically attempting delivery of signals stored in said second storage means to stations identified in said signals.

12. A telecommunications system according to claim 9 including beacon transmitter means associated with said fixed site transceiver means for periodically transmitting a beacon signal.

13. In a telecommunications system including a switched telecommunications network having switching means interconnected by trunk means and station means linked to at least certain of said switching means, the method comprising the steps of:

inputting to a portable transceiver means a message signal;

processing and storing said message signal as a digital signal in storage means associated with said transceiver means;

transmitting by radiation said stored message;

receiving said transmitted message via receiver means comprising a portion of a stationary fixed site transceiver means linked to switching means in said telecommunications network;

storing said received signal in storage means in said telecommunications network as a digital signal;

processing said digital signal stored in said storage means in said telecommunications network and delivering said message signal to at least one of said station means linked to at least certain of said switching means in said telecommunications network.

14. A method according to claim 13 wherein said message is delivered to said station means in audible form.

15. A method according to claim 13 wherein said message is delivered to said station means in visual form.

16. A method according to claim 13 wherein the message signal inputted to said portable transceiver means comprises a voice message; and wherein said message signal delivered to said station means is outputted as a voice signal.

17. A method according to claim 13 wherein said processing of said message signal for inputting to said storage means associated with said transceiver means includes time compression; and said processing of said digital signal stored in said storage means in said telecommunications network includes time expansion.

18. A method according to claim 13 including the steps of:

transmitting from said stationary fixed site a beacon signal containing signal content determined by the geographic location of said stationary fixed site;

receiving said beacon signal at said portable transceiver and delivering a message containing information relating to the location of said fixed site.

19. A method according to claim 13 wherein said transmission by radiation of said stored message is initiated by an operator controlling said portable transceiver means.

20. A method according to claim 19 wherein two-way communication between said portable transceiver means and fixed site transceiver means precedes said transmission of said stored message.

* * * * *